US012217718B2

(12) United States Patent
Zhao et al.

(10) Patent No.: US 12,217,718 B2
(45) Date of Patent: Feb. 4, 2025

(54) DISPLAY SUBSTRATE AND DISPLAY APPARATUS

(71) Applicants: ORDOS YUANSHENG OPTOELECTRONICS CO., LTD., Ordos (CN); BOE TECHNOLOGY GROUP CO., LTD., Beijing (CN)

(72) Inventors: Bo Zhao, Beijing (CN); Jianyun Xie, Beijing (CN); Jingyi Xu, Beijing (CN); Hui Yuan, Beijing (CN); Chao Liang, Beijing (CN); Guodong Wang, Beijing (CN); Biqi Li, Beijing (CN); Peirong Huo, Beijing (CN)

(73) Assignees: ORDOS YUANSHENG OPTOELECTRONICS CO., LTD., Ordos (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/042,194

(22) PCT Filed: Jun. 30, 2022

(86) PCT No.: PCT/CN2022/102985

§ 371 (c)(1),
(2) Date: Feb. 17, 2023

(87) PCT Pub. No.: WO2024/000471

PCT Pub. Date: Jan. 4, 2024

(65) Prior Publication Data

US 2024/0274098 A1 Aug. 15, 2024

(51) Int. Cl.
*G09G 3/36* (2006.01)

(52) U.S. Cl.
CPC ......... *G09G 3/3677* (2013.01); *G09G 3/3607* (2013.01); *G09G 2300/0408* (2013.01);
(Continued)

(58) Field of Classification Search
CPC ............... G09G 3/3677; G09G 3/3607; G09G 2300/0408; G09G 2310/0286; G09G 2320/02; G09G 2330/04
See application file for complete search history.

(56) References Cited

U.S. PATENT DOCUMENTS 10,360,862 B2 7/2019 Yeh et al.
10,396,142 B2 8/2019 Chen
(Continued)

FOREIGN PATENT DOCUMENTS

CN 106601782 A 4/2017
CN 106991990 A 7/2017
(Continued)

OTHER PUBLICATIONS

International Search Report and Written Opinion dated Dec. 19, 2022, for corresponding PCT Application No. PCT/CN2022/102985.

*Primary Examiner* — Amare Mengistu
*Assistant Examiner* — Jennifer L Zubajlo
(74) *Attorney, Agent, or Firm* — Kinney & Lange, P.A.

(57) ABSTRACT

A display substrate is provided, including a display substrate that includes a display area and a bezel area; a plurality of scanning signal lines; a gate driver circuit in the bezel area; a plurality of load compensation units in the bezel area, where the load compensation units are between the gate driver circuit and a plurality of pixel units; and a plurality of scanning signal lead wires in the bezel area. At least one load compensation unit includes a compensation capacitor including a first compensation capacitor electrode in a first conductive layer and a second compensation capacitor electrode in a semiconductor layer, and an orthographic projection of the first compensation capacitor electrode on the base substrate at least partially overlaps with an orthographic projection of the second compensation capacitor electrode
(Continued)

on the base substrate. The first compensation capacitor electrode is electrically connected to a scanning signal lead wire.

17 Claims, 11 Drawing Sheets

(52) U.S. Cl.
CPC . *G09G 2310/0286* (2013.01); *G09G 2320/02* (2013.01); *G09G 2330/04* (2013.01)

(56) References Cited

U.S. PATENT DOCUMENTS

| | | | | |
|---|---|---|---|---|
| 10,403,194 | B2 | 9/2019 | Li et al. | |
| 10,613,670 | B2 | 4/2020 | Lu et al. | |
| 2018/0158417 | A1 | 6/2018 | Xiang et al. | |
| 2019/0013374 | A1 | 1/2019 | Park et al. | |
| 2023/0060545 | A1 * | 3/2023 | Du | G09G 3/3233 |
| 2023/0136237 | A1 * | 5/2023 | Wei | H10K 59/131 345/204 |
| 2023/0237953 | A1 * | 7/2023 | Tian | G09G 3/32 345/55 |

FOREIGN PATENT DOCUMENTS

| | | | | | |
|---|---|---|---|---|---|
| CN | 107424551 | A | * | 12/2017 | G09G 3/20 |
| CN | 107479757 | A | | 12/2017 | |
| CN | 107481669 | A | | 12/2017 | |
| CN | 107785399 | A | | 3/2018 | |
| CN | 208444534 | U | | 1/2019 | |
| CN | 109346485 | A | | 2/2019 | |
| CN | 109471306 | A | | 3/2019 | |
| CN | 209843713 | U | * | 12/2019 | |
| CN | 212515273 | U | | 2/2021 | |
| CN | 215494957 | U | | 1/2022 | |
| CN | 114464644 | A | * | 5/2022 | G09G 3/3233 |

* cited by examiner

DISPLAY SUBSTRATE AND DISPLAY APPARATUS

CROSS-REFERENCE TO RELATED APPLICATION

This application is a Section 371 National Stage Application of International Application No. PCT/CN2022/102985, filed Jun. 30, 2022, entitled "DISPLAY SUBSTRATE AND DISPLAY APPARATUS", incorporated herein by reference in its entirety.

TECHNICAL FIELD

The present disclosure relates to a field of a display technology, and in particular to a display substrate and a display apparatus.

BACKGROUND

With the continuous development of technologies, there is an increasing desire for customized design of special-shaped display screens. In a special-shaped display screen, a display panel has a special-shaped display area, and the number of sub-pixels in each row of pixel units in the special-shaped display area is greatly different from the number of sub-pixels in each row of pixel units in a normal display area. The large difference in the numbers of sub-pixels of the rows of pixel units may lead to a large load difference between the normal display area and the special-shaped display area, or lead to a large load difference between adjacent rows of pixel units, so that a poor display may be caused.

The above information disclosed in this section is merely for the understanding of the background of technical concepts of the present disclosure. Therefore, the above information may contain information that does not constitute a related art.

SUMMARY

In an aspect, a display substrate is provided, including: a base substrate, including a display area and a bezel area on at least one side of the display area; a plurality of pixel units in the display area, where the plurality of pixel units are arranged on the base substrate in an array along a row direction and a column direction, and each pixel unit includes a plurality of sub-pixels; a plurality of scanning signal lines arranged on the base substrate, where the plurality of scanning signal lines are configured to provide a scanning signal to a plurality of rows of sub-pixels respectively; a gate driver circuit arranged on the base substrate and located in the bezel area, where the gate driver circuit is configured to output the scanning signal; a plurality of load compensation units arranged on the base substrate and located in the bezel area, where the plurality of load compensation units are between the gate driver circuit and the plurality of pixel units; and a plurality of scanning signal lead wires arranged on the base substrate and located in the bezel area, where the plurality of scanning signal lead wires are configured to transmit the scanning signal output by the gate driver circuit to the plurality of scanning signal lines respectively. At least one load compensation unit comprises a compensation capacitor comprising a first compensation capacitor electrode in a first conductive layer and a second compensation capacitor electrode in a semiconductor layer, and an orthographic projection of the first compensation capacitor electrode on the base substrate at least partially overlaps with an orthographic projection of the second compensation capacitor electrode on the base substrate; and the first conductive layer is on a side of the semiconductor layer away from the base substrate, and the first compensation capacitor electrode is electrically connected to the scanning signal lead wire.

According to some exemplary embodiments, the display substrate includes N rows of pixel units, and n rows of pixel units among the N rows of pixel units include different numbers of sub-pixels, where N is a positive integer greater than or equal to 2, and n is a positive integer greater than or equal to 2 and less than or equal to N. Each of a plurality of scanning signal lead wires configured to provide the scanning signal to the n rows of pixel units is electrically connected to a respective compensation capacitor, and an area of an overlap between the first compensation capacitor electrode and the second compensation capacitor electrode of the compensation capacitor for each of the n row of pixel units is negatively related to a number of sub-pixels of the row of pixel units.

According to some exemplary embodiments, at least one of the first compensation capacitor electrode and the second compensation capacitor electrode of the compensation capacitor for each of the n rows of pixel units has a size in the row direction which is negatively related to the number of the sub-pixels of the row of pixel units.

According to some exemplary embodiments, the n rows of pixel units comprise an $m^{th}$ row of pixel units and an $(m+i)^{th}$ row of pixel units, and the plurality of rows of pixel units further comprise an $(m+j)^{th}$ row of pixel units, where each of m, i and j is a positive integer greater than or equal to 1. A number of sub-pixels of the $m^{th}$ row of pixel units is less than a number of sub-pixels of the $(m+i)^{th}$ row of pixel units, and the number of the sub-pixels of the $(m+i)^{th}$ row of pixel units is less than a number of sub-pixels of the $(m+j)^{th}$ row of pixel units. The scanning signal lead wire configured to provide the scanning signal to the sub-pixels of the $(m+j)^{th}$ row of pixel units is not electrically connected to the compensation capacitor, and the area of the overlap between the first compensation capacitor electrode and the second compensation capacitor electrode of the compensation capacitor for the $m^{th}$ row of pixel units is greater than the area of the overlap between the first compensation capacitor electrode and the second compensation capacitor electrode of the compensation capacitor for the $(m+i)^{th}$ row of pixel units.

According to some exemplary embodiments, at least one of the first compensation capacitor electrode and the second compensation capacitor electrode of the compensation capacitor for the $m^{th}$ row of pixel units has a size in the row direction greater than a size of at least one of the first compensation capacitor electrode and the second compensation capacitor electrode of the compensation capacitor for the $(m+i)^{th}$ row of pixel units in the row direction.

According to some exemplary embodiments, at least one of the first compensation capacitor electrode and the second compensation capacitor electrode of the compensation capacitor for each of the n rows of pixel units has substantially the same size in the column direction; and/or a ratio of a size of the first compensation capacitor electrode of the compensation capacitor for one of any two rows of pixel units in the row direction and a size of the first compensation capacitor electrode of the compensation capacitor for the other one of the two rows of pixel units in the row direction is between 1.3 and 400; and/or a ratio of a size of the second compensation capacitor electrode of the compensation capacitor for one of any two rows of pixel units in the row direction and a size of the second compensation capacitor electrode of the compensation capacitor for the other one of the two rows of pixel units in the row direction is between 1.3 and 400.

According to some exemplary embodiments, the scanning signal lines and the scanning signal lead wires are in the first conductive layer, and the first compensation capacitor electrode and the scanning signal lead wire that are electrically connected to each other are formed into a continuously extending integral structure.

According to some exemplary embodiments, the display substrate further comprises a first voltage signal lead wire in a second conductive layer, and the second conductive layer is on a side of the first conductive layer away from the base substrate; and the second compensation capacitor electrode is electrically connected to the first voltage signal lead wire.

According to some exemplary embodiments, the display substrate further comprises a first conductive connection portion in the second conductive layer, and the first conductive connection portion extends from the first voltage signal lead wire towards the display area, where the first conductive connection portion is electrically connected to the second compensation capacitor electrode through at least one first via hole.

According to some exemplary embodiments, for at least one row of pixel units, the first conductive connection portion is electrically connected to the second compensation capacitor electrode through a plurality of first via holes, where the plurality of first via holes are arranged in two rows in the column direction.

According to some exemplary embodiments, for one compensation capacitor, the first conductive connection portion electrically connected to the second compensation capacitor electrode of the compensation capacitor extends substantially in parallel to the scanning signal lead wire electrically connected to the first compensation capacitor electrode of the compensation capacitor.

According to some exemplary embodiments, for at least one compensation capacitor, in the column direction, an orthographic projection of the overlap between the first compensation capacitor electrode and the second compensation capacitor electrode of the compensation capacitor on the base substrate is between the first conductive connection portion electrically connected to the first compensation capacitor electrode of the compensation capacitor and the scanning signal lead electrically connected to the second compensation capacitor electrode of the compensation capacitor.

According to some exemplary embodiments, the plurality of rows of pixel units comprise at least one pixel unit group comprising adjacent k rows of pixel units, where k is a positive integer greater than or equal to 2; and each of the k rows of pixel units has the same number of sub-pixels, and has substantially the same area of the overlap between the first compensation capacitor electrode and the second compensation capacitor electrode of the compensation capacitor.

According to some exemplary embodiments, the first compensation capacitor electrode of the compensation capacitor for each of the k rows of pixel units has substantially the same size in the row direction, and the second compensation capacitor electrodes of the compensation capacitor for each of the k rows of pixel units has substantially the same size in the row direction.

According to some exemplary embodiments, the first compensation capacitor electrodes of the compensation capacitors for the k rows of pixel units are aligned with each other in the column direction; and/or the second compensation capacitor electrodes of the compensation capacitors for the k rows of pixel units are aligned with each other in the column direction.

According to some exemplary embodiments, the second compensation capacitor electrode comprises a protruding portion, and an orthographic projection of the protruding portion on the base substrate at least partially overlaps with an orthographic projection of the first conductive connection portion on the base substrate; and the first conductive connection portion is electrically connected to the protruding portion through a plurality of via holes.

According to some exemplary embodiments, the display substrate further comprises a second conductive connection portion in the second conductive layer; and the scanning signal lead wire and the scanning signal line that are configured to provide the scanning signal to a same row of pixel units are electrically connected to each other through the second conductive connection portion.

According to some exemplary embodiments, an end of the scanning signal lead wire proximate to the display area is electrically connected to an end of the second conductive connection portion through a second via hole, and another end of the second conductive connection portion is electrically connected to an end of the scanning signal line through a third via hole.

According to some exemplary embodiments, at least one of the first compensation capacitor electrode and the second compensation capacitor electrode of the compensation capacitor has a hollow structure.

According to some exemplary embodiments, at least one of the first compensation capacitor electrode and the second compensation capacitor electrode of the compensation capacitor comprises a plurality of solid portions and a plurality of hollow portions, and the plurality of solid portions and the plurality of hollow portions are alternately arranged in the row direction.

In another aspect, a display apparatus is provided, including the display substrate described above.

BRIEF DESCRIPTION OF THE DRAWINGS

By describing exemplary embodiments of the present disclosure with reference to the accompanying drawings in detail, features and advantages of the present disclosure will become more apparent.

DETAILED DESCRIPTION OF EMBODIMENTS

Figure 1:
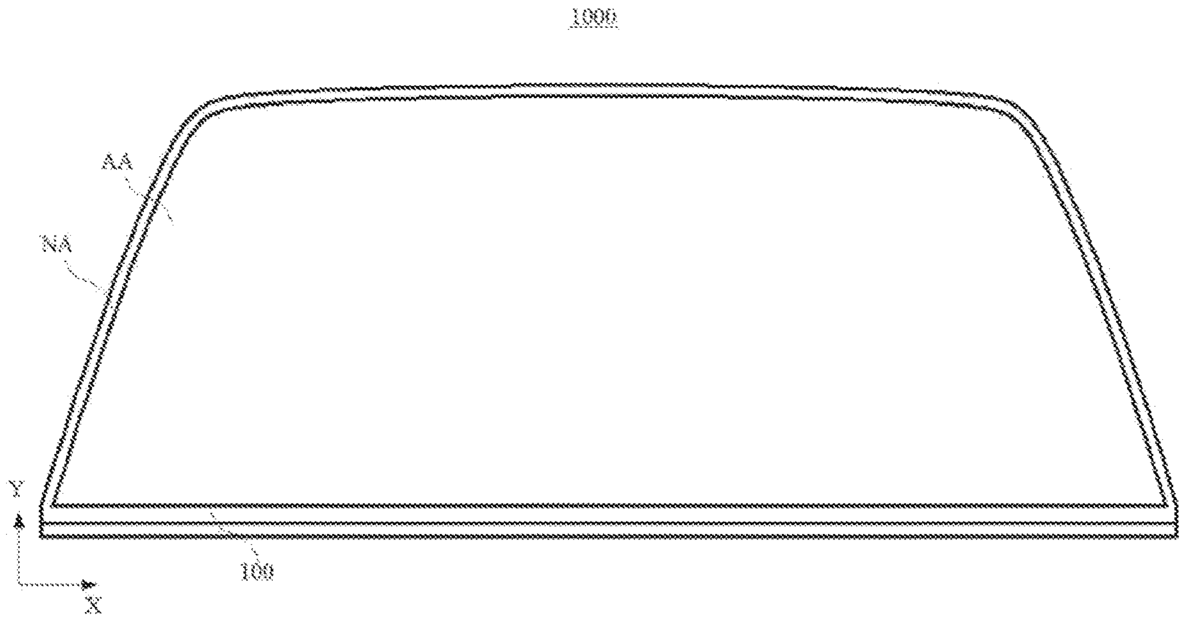
FIG. 1 shows a schematic plan view of a display apparatus according to some exemplary embodiments of the present disclosure.

In order to make objectives, technical solutions and advantages of the present disclosure clearer, technical solutions of embodiments of the present disclosure will be clearly and completely described below with reference to the accompanying drawings. Obviously, the described embodiments are merely some embodiments of the present disclosure, rather than all embodiments. Based on the described embodiments of the present disclosure, all additional embodiments obtained by those ordinary skilled in the art without carrying out inventive effort fall within the scope of protection of the present disclosure.

It should be noted that in the accompanying drawings, for clarity and/or description, sizes and relative sizes of elements may be enlarged. Accordingly, the size and relative size of each element need not to be limited to those shown in the figures. In the specification and the accompanying drawings, the same or similar reference numerals represent the same or similar components.

When an element is described as being "on", "connected to" or "combined with" another element, the element may be directly on the other element, directly connected to the other element, or directly combined with the other element, or an intermediate element may be provided. However, when an element is described as being "directly on", "directly connected to" or "directly combined with" another element, no intermediate element is provided. Other terms and/or expressions used to describe a relationship between elements, such as "between" and "directly between", "adjacent" and "directly adjacent", "on" and "directly on", and so on, should be interpreted in a similar manner. Moreover, the term "connection" may refer to a physical connection, an electrical connection, a communication connection, and/or a fluid connection. In addition, X-axis, Y-axis and Z-axis are not limited to the three axes of a rectangular coordinate system, and may be interpreted in a broader meaning. For example, the X-axis, the Y-axis and the Z-axis may be perpendicular to each other, or may represent different directions that are not perpendicular to each other. For the objective of the present disclosure, "at least one of X, Y or Z" and "at least one selected from a group consisting of X, Y and Z" may be interpreted as only X, only Y, only Z, or any combination of two or more of X, Y and Z, such as XYZ, XY, YZ and XZ. As used herein, the term "and/or" includes any and all combinations of one or more of the listed related items.

It should be noted that although the terms "first", "second", and so on may be used herein to describe various components, members, elements, regions, layers and/or parts, these components, members, elements, regions, layers and/or parts should not be limited by these terms. Rather, these terms are used to distinguish one component, member, element, region, layer and/or part from another one. Thus, for example, a first component, a first member, a first element, a first region, a first layer and/or a first part discussed below may be referred to as a second component, a second member, a second element, a second region, a second layer and/or a second part without departing from teachings of the present disclosure.

For ease of description, spatial relationship terms, such as "upper", "lower", "left", "right", may be used herein to describe a relationship between one element or feature and another element or feature as shown in the figures. It should be understood that the spatial relationship terms are intended to cover other different orientations of a device in use or operation in addition to the orientation described in the figures. For example, if the device in the figures is turned upside down, an element or feature described as being "below" or "under" another element or feature will be oriented "above" or "on" the other element or feature.

Here, the terms "substantially", "about", "approximately" and other similar terms are used as terms of approximation rather than terms of degree, and they are intended to explain an inherent deviation of a measured or calculated value that will be recognized by those ordinary skilled in the art. Taking into account a process fluctuation, a measurement problem, and an error related to a measurement of a specific quantity (that is, a limitation of a measurement system), the terms "substantially", "about" or "approximately" used herein includes a stated value and means that a specific value determined by those ordinary skilled in the art is within an acceptable range of deviation. For example, "about" may mean being within one or more standard deviations, or within ±30%, ±20%, ±10% or ±5% of the stated value.

It should be noted that the expression of "same layer" herein refers to a layer structure that is formed by first forming, using a same film forming process, a film layer used to form a specific pattern, and then patterning, using one patterning process, the film layer with a same mask. Depending on the specific patterns, the patterning process may include multiple processes of exposure, development, or etching, and the specific pattern in the formed layer structure may be continuous or discontinuous. That is, a plurality of elements, components, structures and/or parts located in the "same layer" are made of the same material and formed by the same patterning process. Generally, a plurality of elements, components, structures and/or parts located in the "same layer" have substantially identical thicknesses.

Those skilled in the art should understand that, unless otherwise specified, the expressions "continuously extending", "integral structure", "overall structure" or similar expressions herein mean that a plurality of elements, components, structures and/or parts are located in the same layer and generally formed by the same patterning process during the manufacturing process, and that these elements, components, structures and/or parts are not separated or broken, but are formed as a continuously extending structure.

It should be noted that, the expression "negatively related" herein means that two quantities have opposite change directions. For example, when one quantity becomes larger, the other quantity becomes less; and when one quantity becomes less, the other quantity becomes larger. The expression "positively related" means that two quantities have the same change direction. For example, when one quantity becomes larger, the other quantity also becomes larger; and when one quantity becomes less, the other quantity also becomes less.

Embodiments of the present disclosure provide at least a display substrate and a display apparatus. The display substrate includes: a base substrate, including a display area and a bezel area on at least one side of the display area; a plurality of pixel units in the display area, where the plurality of pixel units are arranged on the base substrate in an array along a row direction and a column direction, and each pixel unit includes a plurality of sub-pixels; a plurality of scanning signal lines arranged on the base substrate, where the plurality of scanning signal lines are configured to provide a scanning signal to a plurality of rows of sub-pixels, respectively; a gate driver circuit arranged on the base substrate and located in the bezel area, where the gate driver circuit is configured to output the scanning signal; a plurality of load compensation units arranged on the base substrate and located in the bezel area, where the plurality of load compensation units are between the gate driver circuit and the plurality of pixel units; and a plurality of scanning signal lead wires arranged on the base substrate and located in the bezel area, where the plurality of scanning signal lead wires are configured to transmit the scanning signal output by the gate driver circuit to the plurality of scanning signal lines, respectively. At least one load compensation unit includes a compensation capacitor. The compensation capacitor includes a first compensation capacitor electrode in a first conductive layer and a second compensation capacitor electrode in a semiconductor layer. An orthographic projection of the first compensation capacitor electrode on the base substrate at least partially overlaps with an orthographic projection of the second compensation capacitor electrode on the base substrate. The first conductive layer is on a side of the semiconductor layer away from the base substrate. The first compensation capacitor electrode is electrically connected to a scanning signal lead wire. In the embodiments of the present disclosure, load compensation may be performed for the respective rows of pixel units whose loads are inconsistent, so that loads on the scanning signal lines for the rows of pixel units are substantially consistent. In this way, it is possible to at least improve or even eliminate a display non-uniformity of display subregions and other undesirable phenomena.

Figure 2:
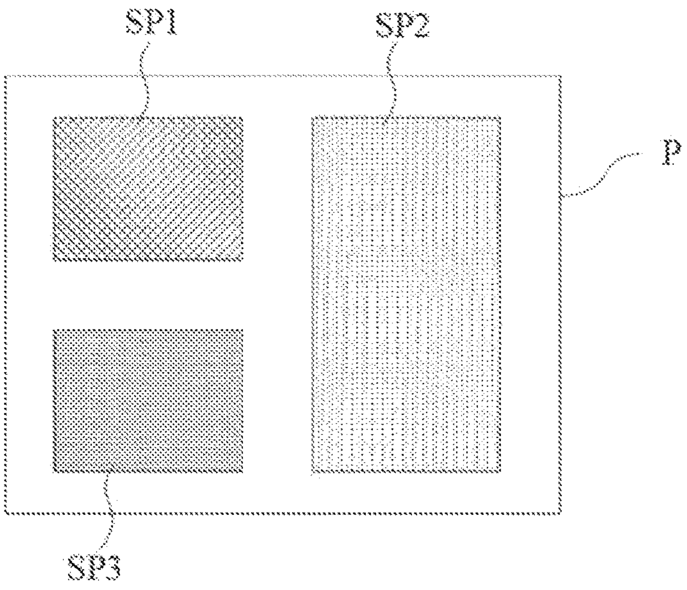
FIG. 2 schematically shows a schematic diagram of a pixel layout of the display apparatus shown in FIG. 1.

FIG. 1 shows a schematic plan view of a display apparatus according to some exemplary embodiments of the present disclosure. FIG. 2 schematically shows a schematic diagram of a pixel layout of the display apparatus shown in FIG. 1.

With reference to FIG. 1 and FIG. 2 in combination, a display apparatus 1000 may include a display substrate. The display substrate may include a base substrate 100, and the base substrate 100 may include a display area AA and a bezel area NA on at least one side of the display area. It should be noted that the bezel area NA surrounds the display area AA in the embodiment shown in FIG. 1, but the embodiments of the present disclosure are not limited to this. In other embodiments, the bezel area NA may be located on at least one side of the display area AA without surrounding the display area AA.

The display substrate may include a plurality of pixel units P in the display area AA. It should be noted that the pixel unit P is a minimum unit for displaying an image. For example, the pixel unit P may include a light-emitting device that emits white light and/or a light-emitting device that emits color light.

A plurality of pixel units P may be arranged in a matrix with rows extending along a first direction X (e.g., a row direction) and columns extending along a second direction Y (e.g., a column direction). However, the embodiments of the present disclosure do not specifically limit an arrangement form of the pixel units P, and the pixel units P may be arranged in various forms. For example, the pixel units P may be arranged such that a direction inclined with respect to the first direction X and the second direction Y is the column direction, and a direction intersecting the column direction is the row direction.

A pixel unit P may include a plurality of sub-pixels. For example, a pixel unit P may include three sub-pixels, including a first sub-pixel SP1, a second sub-pixel SP2, and a third sub-pixel SP3. For another example, a pixel unit P may include four sub-pixels, including a first sub-pixel, a second sub-pixel, a third sub-pixel, and a fourth sub-pixel. For example, the first sub-pixel SP1 may be a red sub-pixel, the second sub-pixel SP2 may be a green sub-pixel, the third sub-pixel SP3 may be a blue sub-pixel, and the fourth sub-pixel may be a white sub-pixel.

Figure 3A:
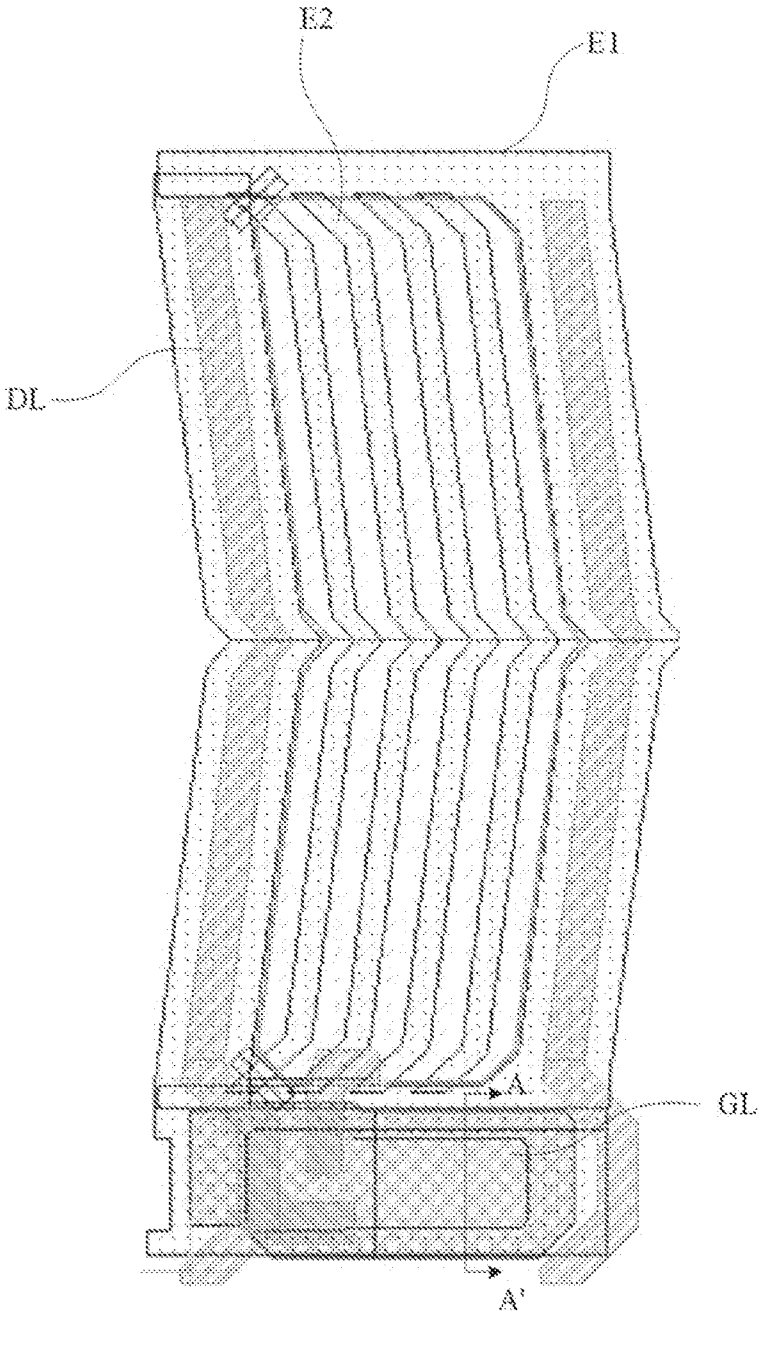
FIG. 3A schematically shows a schematic structural diagram of a sub-pixel in a display substrate according to some exemplary embodiments of the present disclosure.

In some exemplary embodiments, the display substrate may be a liquid crystal display substrate, for example, an array substrate of a liquid crystal display panel. FIG. 3A schematically shows a schematic structural diagram of a sub-pixel in a display substrate according to some exemplary embodiments of the present disclosure. With reference to FIG. 1 to FIG. 3A in combination, the display substrate may include a first electrode E1, a second electrode E2, a data signal line DL and a scanning signal line GL, which are all arranged on the base substrate 100. It should be understood that in a case that the display panel is a liquid crystal display panel, the display panel may include a liquid crystal layer between an array substrate and a color filter substrate. A specific structure of the array substrate, the color filter substrate, and the liquid crystal layer may refer to a structure of an existing liquid crystal display panel, and details will not be described here. The first electrode E1 and the second electrode E2 may be driven by a driving signal so that a corresponding liquid crystal electric field may be generated. Liquid crystals in the liquid crystal layer may deflect under the action of the liquid crystal electric field, so as to realize a corresponding display function. For example, the liquid crystal layer may be arranged between the first electrode E1 and the second electrode E2. One of the first electrode E1 and the second electrode E2 may be a pixel electrode, and the other of the first electrode E1 and the second electrode E2 may be a common electrode. For example, the first electrode E1 is a common electrode, and the second electrode E2 is a pixel electrode.

In some specific embodiments, at least one sub-pixel further includes a thin film transistor T electrically connected to the data signal line DL. In the embodiments of the present disclosure, the thin film transistor T may have a top-gate structure or a bottom-gate structure, which may be specifically determined as desired and is not limited here.

The thin film transistor T in the embodiments of the present disclosure will be described below by taking a thin film transistor T having a top gate structure as an example.

Figure 3B:
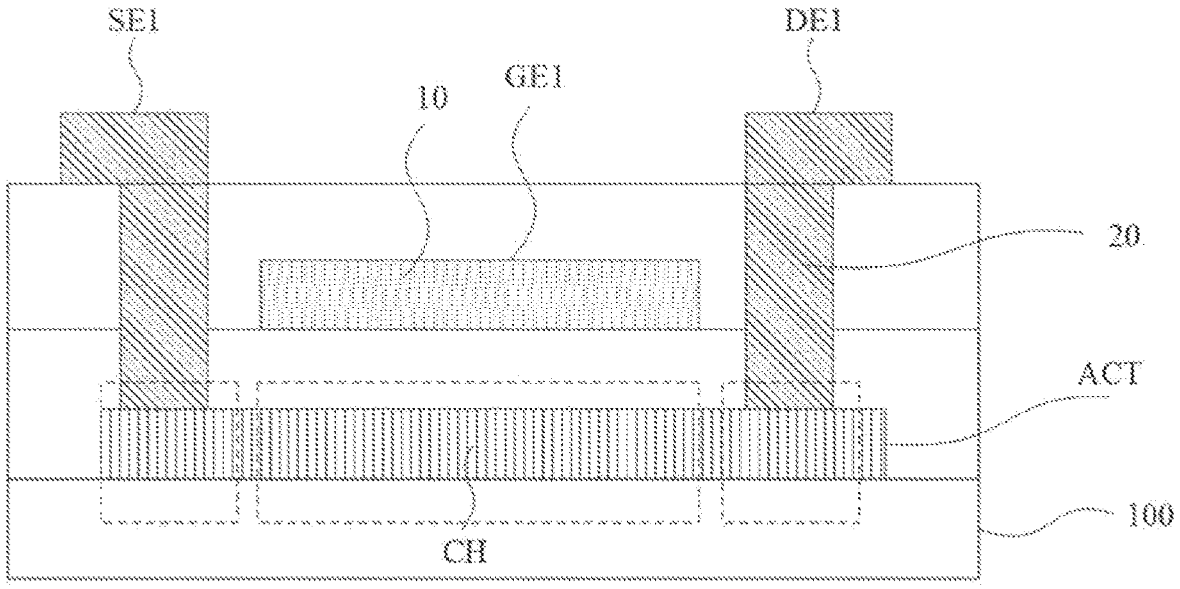
FIG. 3B schematically shows a sectional view of a thin film transistor in an embodiment of the present disclosure.
Figure 16:
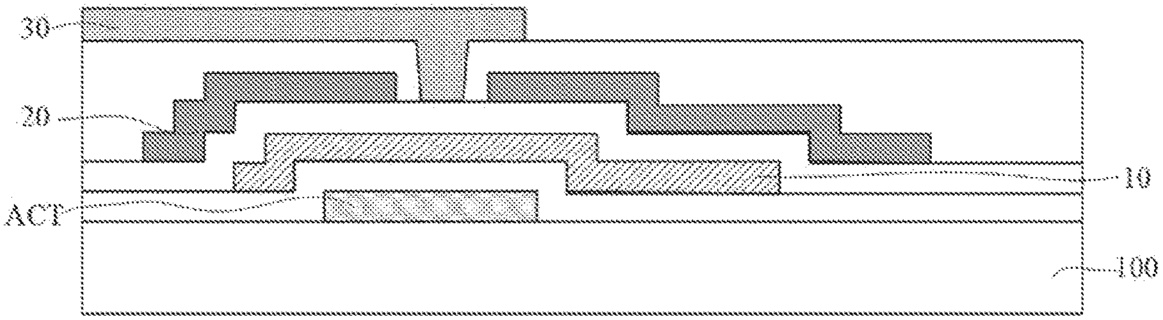
FIG. 16 shows a sectional view of a display substrate taken along the line AA' in FIG. 3A, according to some exemplary embodiments of the present disclosure.

FIG. 3B schematically shows a sectional view of a thin film transistor in an embodiment of the present disclosure, and FIG. 16 shows a sectional view of a display substrate taken along the line AA' in FIG. 3A according to some exemplary embodiments of the present disclosure. With reference to FIG. 3A, FIG. 3B, and FIG. 16 in combination, the display substrate may include: a semiconductor layer ACT on the base substrate 100; a first conductive layer 10 on a side of the semiconductor layer ACT away from the base substrate 100; a second conductive layer 20 on a side of the first conductive layer 10 away from the base substrate 100; and a third conductive layer 30 on a side of the second conductive layer 20 away from the base substrate 100. For example, the thin film transistor T may include an active layer CH, a gate electrode GE1, a source electrode SE1, and a drain electrode DE1. The active layer CH of the thin film transistor T may be in the semiconductor layer ACT, the gate electrode GE1 of the thin film transistor T may be in the first conductive layer 10, and the source electrode SE1 and the drain electrode DE1 of the thin film transistor T may be in the second conductive layer 20. For example, the first electrode E1 (e.g., a common electrode) may be in the third conductive layer 30.

As shown in FIG. 3A, the display substrate may be designed with a sub-pixel structure of 2Pixel2Domain (2P2D). Each sub-pixel may include a plurality of strip pixel electrodes E2, and the plurality of strip pixel electrodes E2 of each sub-pixel are separated by slits. The so-called "2Pixel2Domain" means that pixel electrodes E2 of two adjacent rows of sub-pixels have different extension directions, and the pixel electrodes E2 of each adjacent two rows of sub-pixels are approximately symmetrical with respect to a scanning signal line GL. As such, in the display substrate, for two adjacent rows of sub-pixels, the pixel electrodes E2 of one row of sub-pixels and the common electrode E1 may form a first domain electric field, and the pixel electrodes E2 of the other row of sub-pixels and the common electrode E1 may form a second domain electric field. A direction of the first domain electric field is different from a direction of the second domain electric field. In other words, an angle is formed between directions of electric fields corresponding to every two adjacent rows of sub-pixels, so that light output directions of the two adjacent rows of sub-pixels may be mutually compensated, which may help improve the display effect.

Referring back to FIG. 1, the display substrate may have an irregular shape, which may include any special shape. It should be understood that the embodiments of the present disclosure do not specifically limit the shape of the display substrate. A special shape shown in FIG. 1 will be illustrated below by way of example in describing the embodiments of the present disclosure.

In an embodiment of the present disclosure, the display substrate includes N rows of pixel units, where N is a positive integer greater than or equal to 2. For example, referring to FIG. 1, at least one row of pixel units are arranged in the display area AA. In the embodiments shown in FIG. 1, the number of sub-pixels of each row of pixel units decreases irregularly from bottom to top. For example, the number of sub-pixels of each row of pixel units in a lower display area is greater than the number of sub-pixels of each row of pixel units in a middle display area, and the number of sub-pixels of each row of pixel units in the middle display area is greater than the number of sub-pixels of each row of pixel units in an upper display area.

For each row of pixel units, the scanning signal line GL is provided to supply the scanning signal to the respective sub-pixels in the row of pixel units. In the embodiments of the present disclosure, among the N rows of pixel units, n rows of pixel units include different numbers of sub-pixels, where n is a positive integer greater than or equal to 2 and less than or equal to N. The scanning signal lines GL for the n rows of pixel units have different loads electrically connected. For example, a theoretical load of the scanning signal line for each row of pixel units may be calculated according to a design diagram of the display substrate, and the load corresponding to the scanning signal line may include a resistance load and a capacitance load.

A resistance R of a scanning signal line for an $i^{th}$ row of pixel units in the N rows of pixel units may be calculated using the following formula:

Ri=Rs*L/W, where L represents a length of the scanning signal line for the $i^{th}$ row of pixel units, W represents a width of the scanning signal line for the $i^{th}$ row of pixel units, and Rs represents a sheet resistance of a metal material used for the scanning signal line for the $i^{th}$ row of pixel units.

A capacitance Ci of the scanning signal line for the $i^{th}$ row of pixel units in the N rows of pixel units may be calculated using the following formula:

Ci=Ni*Cpixel, where Ni represents the number of sub-pixels of the $i^{th}$ row of pixel units, and Cpixel represents a capacitance load value of a single sub-pixel, which may be obtained by a software extraction or by calculating a plate capacitance according to an area.

The inventors found through researches that the respective rows of pixel units with different loads achieve different charging voltages within the same charging time, which may cause a non-uniform display of sub display regions and other undesirable phenomena in an actual display.

In the embodiments of the present disclosure, load compensation may be performed on the rows of pixel units with different loads. For example, load compensation units may be electrically connected to the scanning signal lines for the respective rows of pixel units that need the load compensation, so that loads on the scanning signal lines for the respective rows of pixel units are substantially consistent. In this way, it is possible to at least improve or even eliminate the non-uniform display of sub display regions and other undesirable phenomena.

With reference to FIG. 1 to FIG. 3B in combination, the display substrate according to some exemplary embodiments of the present disclosure may include: a base substrate 100 including a display area AA and a bezel area NA on at least one side of the display area; a plurality of pixel units P in the display area AA, where the plurality of pixel units are arranged on the base substrate 100 in an array along a row direction X and a column direction Y, and each row of pixel units P may include a plurality of sub-pixels; a plurality of scanning signal lines GL arranged on the base substrate 100, where the plurality of scanning signal lines GL are configured to provide a scanning signal to the plurality of rows of pixel units P, respectively; a plurality of load compensation units 200 arranged on the base substrate 100 and located in the bezel area NA, where the plurality of load compensation units are electrically connected to at least some of the plurality of scanning signal lines GL, respectively; and a common electrode E1 arranged on the base substrate 100, where at least part of the common electrode E1 is in the display area AA, and the common electrode E1 is connected to a common voltage signal.

It should be noted that herein, the common voltage signal may be referred to as a first voltage signal.

In the embodiments of the present disclosure, at least one load compensation unit may include a compensation capacitor.

For example, the compensation capacitor may include a first compensation capacitor electrode and a second compensation capacitor electrode. The first compensation capacitor electrode is electrically connected to the scanning signal lead wire, and the second compensation capacitor electrode receives the first voltage signal. An orthographic projection of the first compensation capacitor electrode on the base substrate at least partially overlaps with an orthographic projection of the second compensation capacitor electrode on the base substrate. For the n rows of pixel units, each of the plurality of scanning signal lead wires used to provide the scanning signal to the n rows of pixel units is electrically connected to a respective compensation capacitor, and an area of the overlap between the first compensation capacitor electrode and the second compensation capacitor electrode of the compensation capacitor for each of the n rows of pixel units is negatively related to the number of sub-pixels of the row of pixel units. For the at least n rows of pixel units, at least one of the first compensation capacitor electrode and the second compensation capacitor electrode of the compensation capacitor for each row of pixel units has a size in the row direction, where the size is negatively related to the number of sub-pixels of the row of pixel units.

In the display substrate provided by the embodiments of the present disclosure, the less the number of sub-pixels connected to a scanning signal line corresponding to a load compensation unit, the greater the compensation load value of the load compensation unit. The scanning signal lines having different numbers of sub-pixels are compensated by load compensation units having different compensation load values, so that the loads on different scanning signal lines may be uniform, thereby avoiding a display difference and ensuring a display quality.

Figure 4:
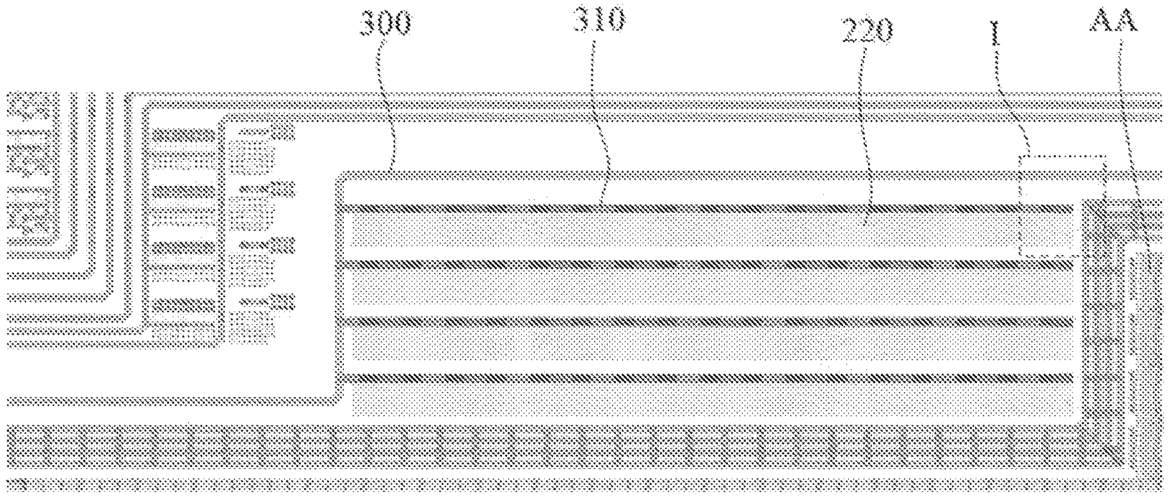
FIG. 4 shows a partial plan view of a display substrate according to some exemplary embodiments of the present disclosure, in which an electrode of compensation capacitors for several rows of pixel units is schematically shown.
Figure 5:
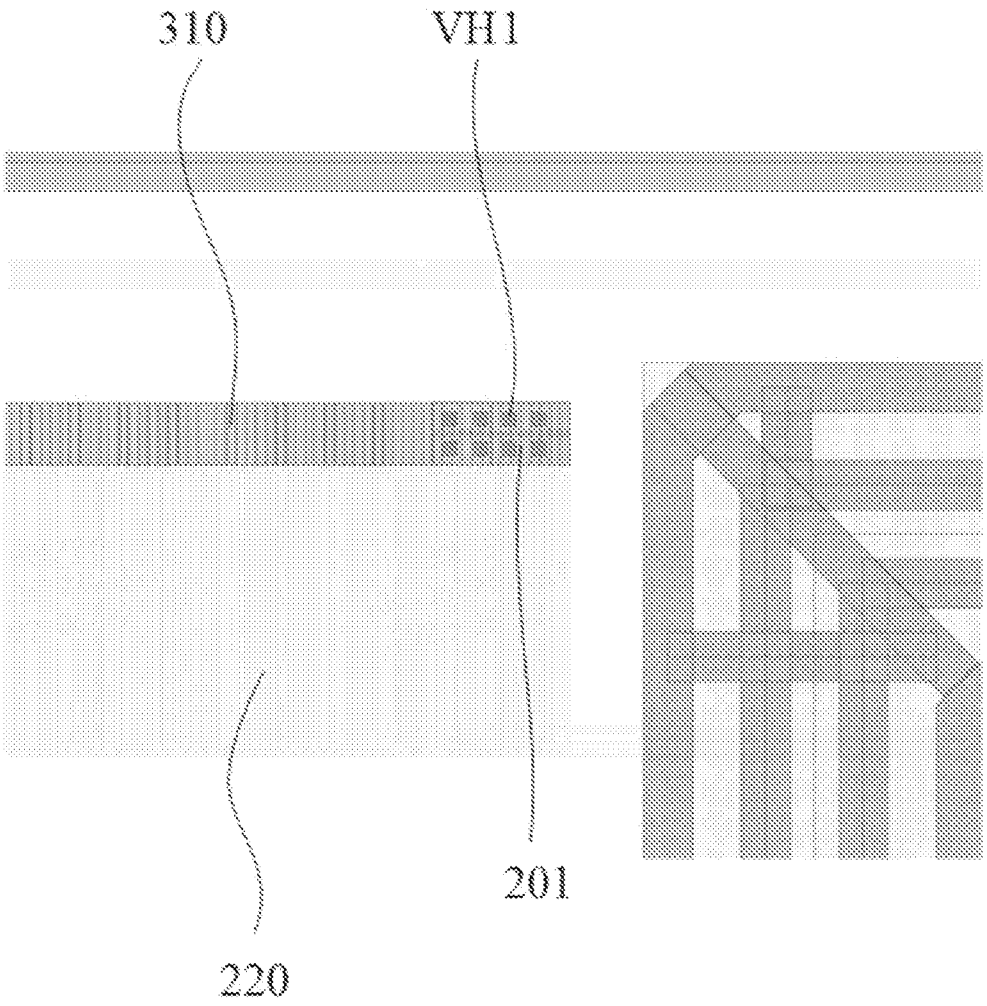
FIG. 5 shows a partial enlarged view of the region I in FIG. 4.
Figure 6:
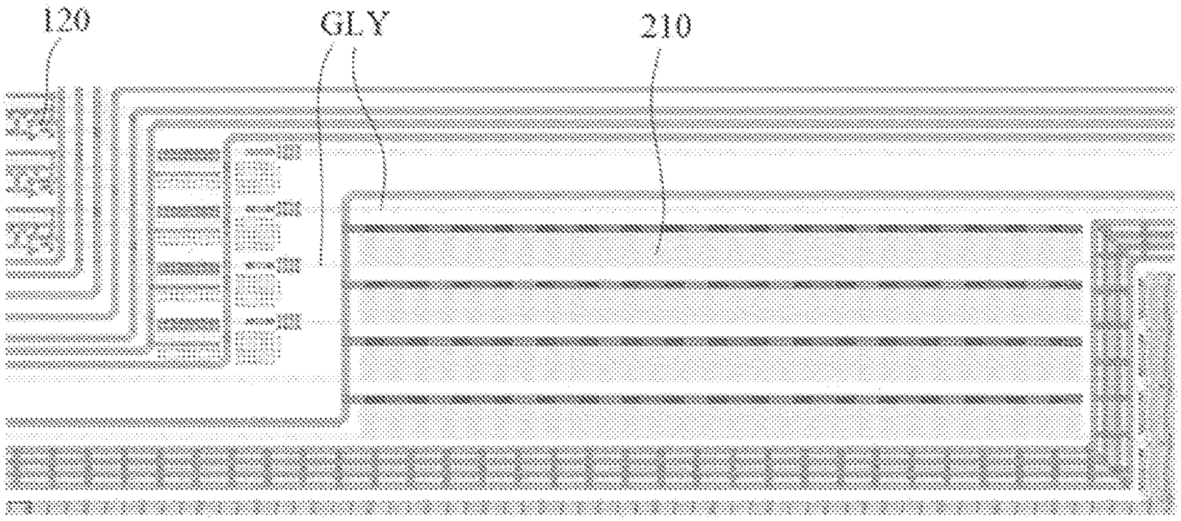
FIG. 6 shows a partial plan view of a display substrate according to some exemplary embodiments of the present disclosure, in which another electrode of compensation capacitors for several rows of pixel units is schematically shown.
Figure 7:
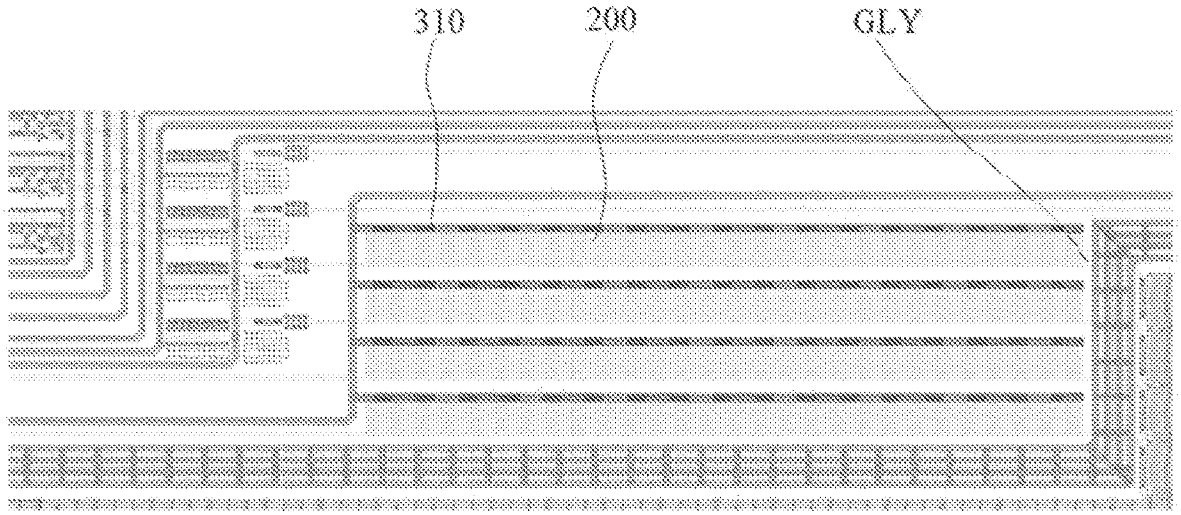
FIG. 7 shows a partial plan view of a display substrate according to some exemplary embodiments of the present disclosure, in which two electrodes of compensation capacitors for several rows of pixel units are schematically shown.
Figure 8:
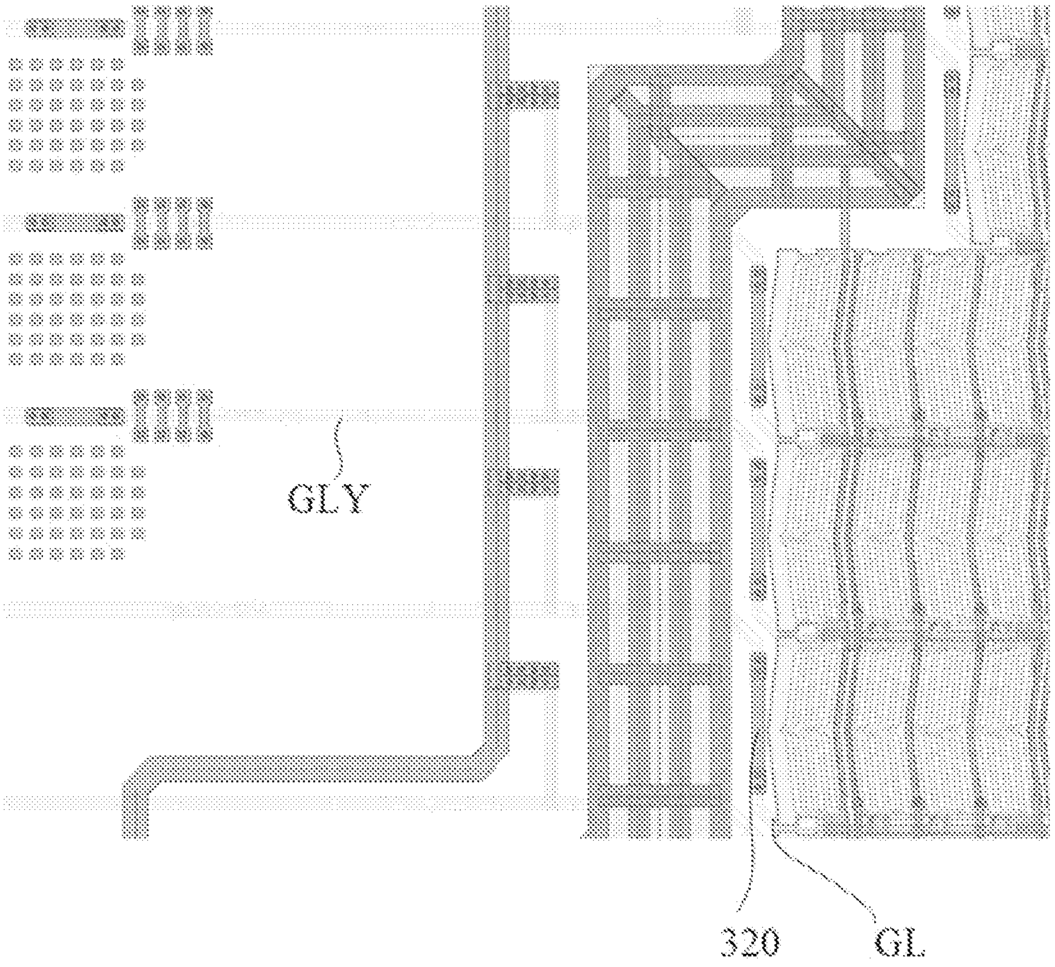
FIG. 8 shows a partial plan view of a display substrate according to some exemplary embodiments of the present disclosure, in which an ESD protection structure for several rows of pixel units is schematically shown.
Figure 9:
FIG. 9 shows a partial plan view of a display substrate according to some other exemplary embodiments of the present disclosure.
Figure 10:
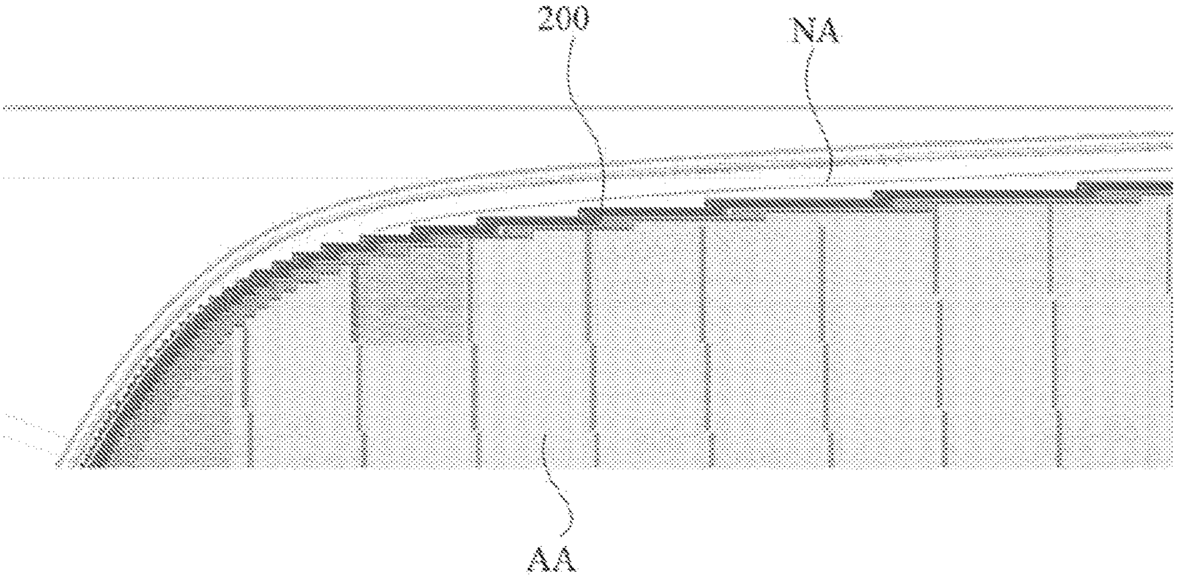
FIG. 10 shows a partial schematic diagram of a display substrate according to some exemplary embodiments of the present disclosure.
Figure 11:
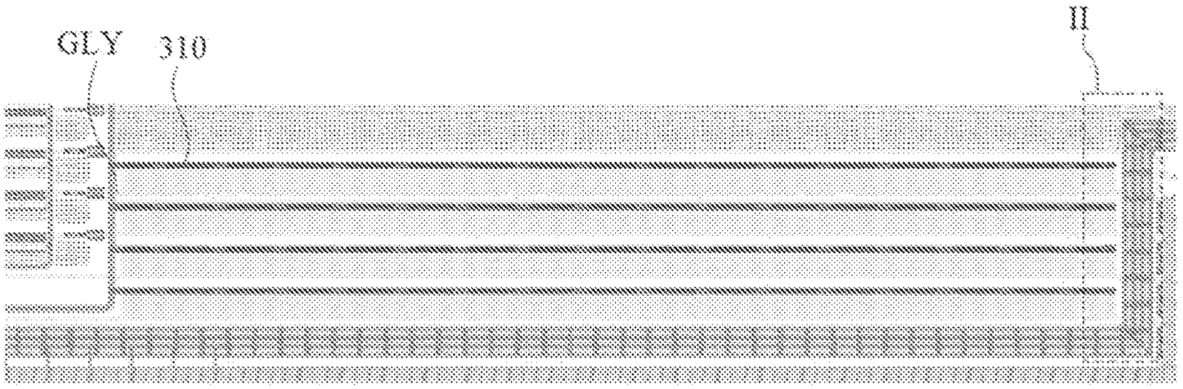
FIG. 11 shows a partial plan view of a display substrate according to some exemplary embodiments of the present disclosure, in which compensation capacitors for several rows of pixel units is schematically shown.
Figure 12:
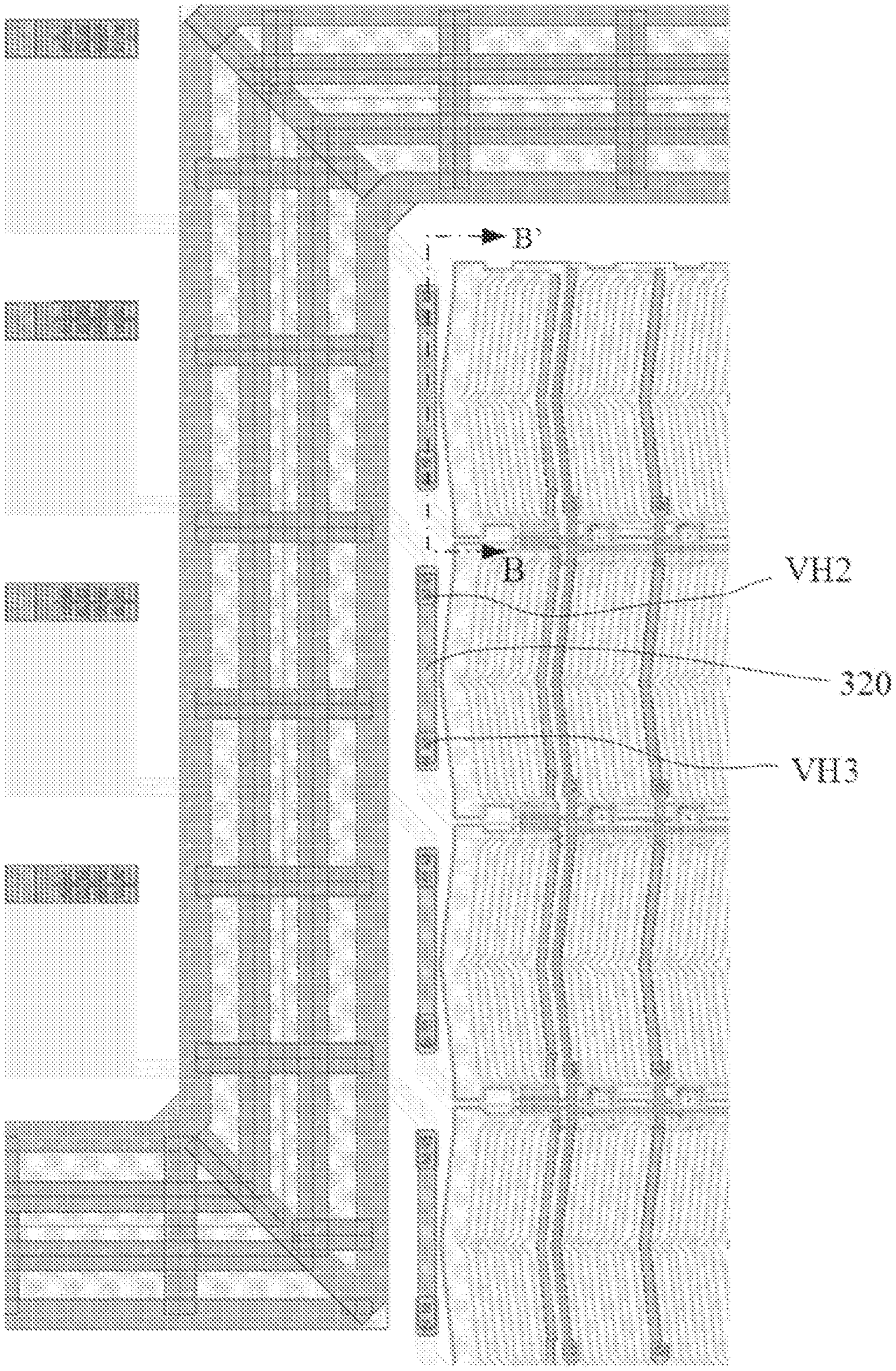
FIG. 12 shows a partial enlarged view of the region II in FIG. 11.
Figure 13:
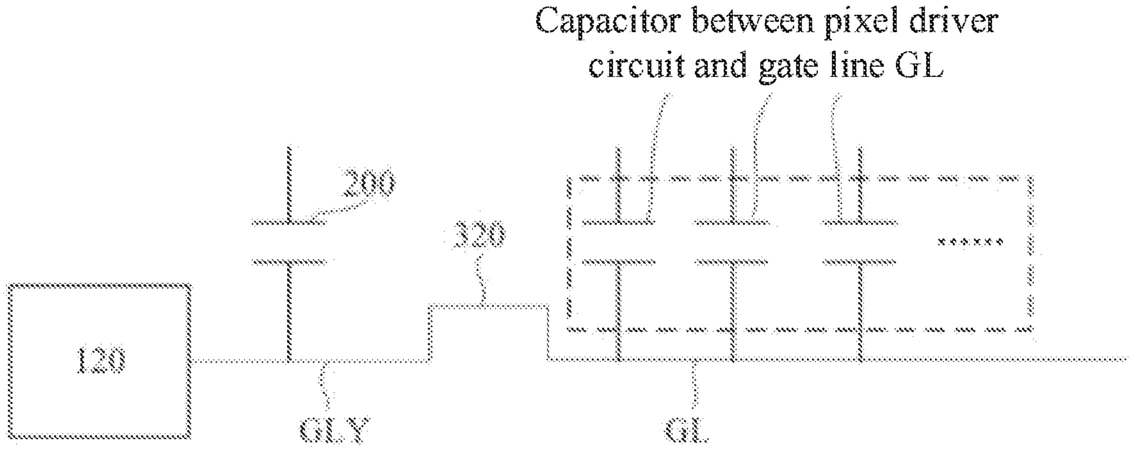
FIG. 13 schematically shows an equivalent circuit of a compensation capacitor and an ESD protection structure.
Figure 14:
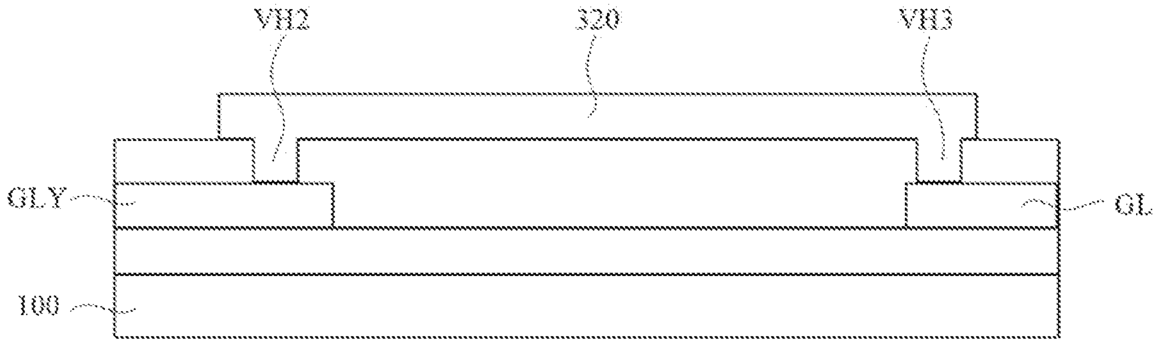
FIG. 14 shows a sectional view taken along the line BB' in FIG. 12.
Figure 15:
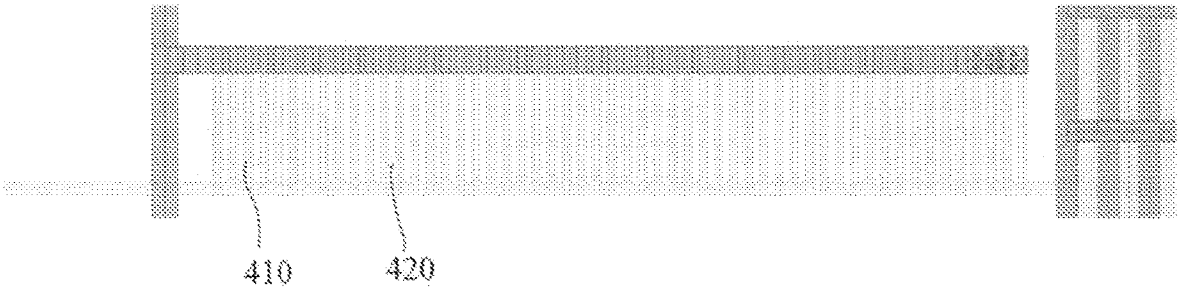
FIG. 15 shows a partial plan view of a display substrate according to some other exemplary embodiments of the present disclosure.

FIG. 4 shows a partial plan view of a display substrate according to some exemplary embodiments of the present disclosure, in which an electrode of compensation capacitors for several rows of pixel units is schematically shown. FIG. 5 shows a partial enlarged view of the region I in FIG. 4. FIG. 6 shows a partial plan view of a display substrate according to some exemplary embodiments of the present disclosure, in which another electrode of the compensation capacitors for several rows of pixel units is schematically shown. FIG. 7 shows a partial plan view of a display substrate according to some exemplary embodiments of the present disclosure, in which two electrodes of compensation capacitors for several rows of pixel units are schematically shown. FIG. 8 shows a partial plan view of the display substrate according to some exemplary embodiments of the present disclosure, in which an ESD protection structure for several rows of pixel units is schematically shown. FIG. 9 shows a partial plan view of a display substrate according to some other exemplary embodiments of the present disclosure. FIG. 10 shows a partial schematic diagram of a display substrate according to some exemplary embodiments of the present disclosure. FIG. 11 shows a partial plan view of a display substrate according to some exemplary embodiments of the present disclosure, in which compensation capacitors for several rows of pixel units is schematically shown. FIG. 12 shows a partial enlarged view of the region II in FIG. 11. FIG. 13 schematically shows an equivalent circuit of a compensation capacitor and an ESD protection circuit. FIG. 14 shows a sectional view taken along the line BB' in FIG. 12. FIG. 15 shows a partial plan view of a display substrate according to some other exemplary embodiments of the present disclosure.

According to some exemplary embodiments of the present disclosure, the display substrate may adopt a GOA technology, i.e., Gate Driver on Array. According to the GOA technology, a driver circuit is directly arranged on the array substrate or display substrate, instead of bonding an external driver chip. Each GOA unit acts as a stage of shift register, and each stage of shift register is connected to a scanning signal line. A plurality of stages of shift registers output turn-on voltages in sequence, so that a progressive scanning of pixels may be achieved. In some embodiments, each stage of shift register may also be connected to a plurality of scanning signal lines. In this way, it is possible to adapt to a development trend of high resolution and narrow bezel of the display substrate.

With reference to FIG. 1 to FIG. 16 in combination, the display substrate may include: a base substrate 100 including a display area AA and a bezel area NA on at least one side of the display area; a plurality of pixel units P in the display area, where the plurality of pixel units are arranged on the base substrate in an array along a row direction and a column direction, and each pixel unit includes a plurality of sub-pixels; a plurality of scanning signal lines GL arranged on the base substrate, where the plurality of scanning signal lines are configured to provide scanning signal to a plurality of rows of sub-pixels, respectively; a gate driver circuit 120 arranged on the base substrate and located in the bezel area, where the gate driver circuit is configured to output scanning signal; a plurality of load compensation units arranged on the base substrate and located in the bezel area, where the plurality of load compensation units are between the gate driver circuit 120 and the plurality of pixel units P; and a plurality of scanning signal lead wires GLY arranged on the base substrate and located in the bezel area, where the plurality of scanning signal lead wires are configured to transmit the scanning signal output by the gate driver circuit to the plurality of scanning signal lines, respectively.

In the embodiments of the present disclosure, at least one load compensation unit includes a compensation capacitor 200, and the compensation capacitor includes a first compensation capacitor electrode 210 and a second compensation capacitor electrode 220. The first compensation capacitor electrode 210 is in a first conductive layer 10, and the second compensation capacitor electrode 220 is in a semiconductor layer ACT. An orthographic projection of the first compensation capacitor electrode 210 on the base substrate at least partially overlaps with an orthographic projection of the second compensation capacitor electrode 220 on the base substrate. The first compensation capacitor electrode 210 is electrically connected to the scanning signal lead wire GLY.

For example, the n rows of pixel units include an $m^{th}$ row of pixel units and an $(m+i)^{th}$ row of pixel units, and the plurality of rows of pixel units further include an $(m+j)^{th}$ row of pixel units, where m, each of i and j is a positive integer greater than or equal to 1. The number of sub-pixels of the $m^{th}$ row of pixel units is less than the number of sub-pixels of the $(m+i)^{th}$ row of pixel units, and the number of the sub-pixels of the $(m+i)^{th}$ row of pixel units is less than the number of sub-pixels of the $(m+j)^{th}$ row of pixel units. The scanning signal lead wire used to provide the scanning signal to the sub-pixels of the $(m+j)^{th}$ row of pixel units is not electrically connected to the compensation capacitor. An area of the overlap between the first compensation capacitor electrode and the second compensation capacitor electrode of the compensation capacitor for the $m^{th}$ row of pixel units is greater than an area of the overlap between the first compensation capacitor electrode and the second compensation capacitor electrode of the compensation capacitor for the $(m+i)^{th}$ row of pixel units.

It should be noted that the expression "the scanning signal lead wire is not electrically connected to the compensation capacitor" means that the scanning signal lead wire is not provided with a corresponding compensation capacitor, and thus the scanning signal lead wire is not electrically connected to the compensation capacitor. For example, in the embodiments shown in FIG. 1, the $(m+j)^{th}$ row of pixel units may be a row of pixel units at a lower side shown in FIG. 1. The $(m+j)^{th}$ row of pixel units includes a large number of sub-pixels, and the load compensation is not required. Therefore, it is not required to provide a compensation capacitor to the scanning signal lead wire for the $(m+j)^{th}$ row of pixel units, and then the scanning signal lead wire for the $(m+j)^{th}$ row of pixel units is not electrically connected to a compensation capacitor.

For example, at least one of the first compensation capacitor electrode and the second compensation capacitor electrode of the compensation capacitor for the $m^{th}$ row of pixel units has a size in the row direction greater than a size of at least one of the first compensation capacitor electrode and the second compensation capacitor electrode of the compensation capacitor for the $(m+i)^{th}$ row of pixel units in the row direction.

For example, for the n rows of pixel units, at least one of the first compensation capacitor electrode and the second compensation capacitor electrode of the compensation capacitor for each of the n rows of pixel units has substantially the same size in the column direction. For the n rows of pixel units, a ratio of a size of the first compensation capacitor electrode of the compensation capacitor for one of any two rows of pixel units in the row direction and a size of the first compensation capacitor electrode of the compensation capacitor for the other one of the two rows of pixel units in the row direction is between 1.3 and 400; and/or a ratio of a size of the second compensation capacitor electrode of the compensation capacitor for one of any two rows of pixel units in the row direction and a size of the second compensation capacitor electrode of the compensation capacitor for the other one of the two rows of pixel units in the row direction is between 1.3 and 400.

The scanning signal lines GL and the scanning signal lines GLY are in the first conductive layer 10, and the first compensation capacitor electrode 210 and the scanning signal line GLY that are electrically connected to each other are formed into a continuously extending integral structure.

The display substrate further includes a first voltage signal lead wire 300 in the second conductive layer 20. The second compensation capacitor electrode 220 is electrically connected to the first voltage signal lead wire 300.

The display substrate further includes a first conductive connection portion 310 located in the second conductive layer 20, and the first conductive connection portion 310 extends from the first voltage signal lead wire 300 towards the display area AA.

The first conductive connection portion 310 is electrically connected to the second compensation capacitor electrode 220 through at least one first via hole VH1.

As shown in FIG. 5, for at least one row of pixel units, the first conductive connection portion 310 is electrically connected to the second compensation capacitor electrode 220 through a plurality of first via holes VH1, and the plurality of first via holes VH1 are arranged in two rows in the column direction Y.

As shown in FIG. 6, for one compensation capacitor, the first conductive connection portion 310 electrically connected to the second compensation capacitor electrode 220 of the compensation capacitor extends substantially in parallel to the scanning signal lead wire GLY electrically connected to the first compensation capacitor electrode of the compensation capacitor.

As shown in FIG. 7, for at least one compensation capacitor, in the column direction Y, an orthographic projection of the overlap between the first compensation capacitor electrode 210 and the second compensation capacitor electrode 220 of the compensation capacitor on the base substrate is between the first conductive connection portion 310 electrically connected to the first compensation capacitor electrode of the compensation capacitor and the scanning signal lead wire GLY electrically connected to the second compensation capacitor electrode of the compensation capacitor.

As shown in FIG. 7, the plurality of rows of pixel units include at least one pixel unit group including adjacent k rows of pixel units, where k is a positive integer greater than or equal to 2. Each of the k rows of pixel units has the same number of sub-pixels, and each of the n rows of pixel units has substantially the same area of the overlap between the first compensation capacitor electrode and the second compensation capacitor electrode of the compensation capacitor.

For the k rows of pixel units, the first compensation capacitor electrode of the compensation capacitor for each of the k rows of pixel units has substantially the same size in the row direction, and the second compensation capacitor electrode of the compensation capacitor for each of the k rows of pixel units has substantially the same size in the row direction.

For the k rows of pixel units, the first compensation capacitor electrodes of the compensation capacitors for the k rows of pixel units are aligned with each other in the column direction; and/or, the second compensation capacitor electrodes of the compensation capacitors for the k rows of pixel unit are aligned with each other in the column direction.

As shown in FIG. 5, the second compensation capacitor electrode 220 includes a protruding portion 201, and an orthographic projection of the protruding portion 201 on the base substrate at least partially overlaps with an orthographic projection of the first conductive connection portion 310 on the base substrate. The first conductive connection portion 310 is electrically connected to the protruding portion 201 through a plurality of via holes.

As shown in FIG. 8, the display substrate further includes a second conductive connection portion 320 in the second conductive layer 20. The scanning signal lead wire GLY and the scanning signal line GL that provide the scanning signal for a same row of pixel units are electrically connected through the second conductive connection portion 320.

An end of the scanning signal lead wire GLY proximate to the display area AA is electrically connected to an end of the second conductive connection portion 320 through a second via hole VH2, and another end of the second conductive connection portion 320 is electrically connected to an end of the scanning signal line GL through a third via hole VH3. Through such conductive transfer structure, the scanning signal lead wire GLY and the scanning signal line GL are electrically connected. Such transfer layer design may reduce a continuous extension length of conductive wires of a same kind, so that an electrostatic burning may be prevented.

As shown in FIG. 15, at least one of the first compensation capacitor electrode and the second compensation capacitor electrode of the compensation capacitor has a hollow structure.

For example, at least one of the first compensation capacitor electrode and the second compensation capacitor electrode of the compensation capacitor includes a plurality of solid portions 410 and a plurality of hollow portions 420. The plurality of solid portions 410 and the plurality of hollow portions 420 are arranged alternately in the row direction.

In the embodiments of the present disclosure, on the premise of ensuring a large conductive area, by designing at least one of the first compensation capacitor electrode or the second compensation capacitor electrode as a conductive portion having a hollow structure, it is possible to prevent the static electricity from gathering on the first compensation capacitor electrode and the second compensation capacitor electrode, which may be conducive to static electricity preventing.

At least some embodiments of the present disclosure further provide a display panel including the display substrate as described above. For example, the display panel may be a liquid crystal display panel.

At least some embodiments of the present disclosure further provide a display apparatus, and the display apparatus may include the display substrate as described above. The display apparatus includes the display area AA and the bezel area NA, and the bezel area NA has a small width, so that a display apparatus with a narrow bezel is achieved.

The display apparatus may include any apparatus or product having a display function. For example, the display apparatus may be a smart phone, a mobile phone, an e-book reader, a personal computer (PC), a laptop PC, a netbook PC, a personal digital assistant (PDA), a portable multimedia player (PMP), a digital audio player, a mobile medical apparatus, a camera, a wearable device (such as a head-mounted device, electronic clothing, electronic bracelet, electronic necklace, electronic accessory, electronic tattoo, or smart watch), a television, and so on.

It should be understood that the display apparatus according to the embodiments of the present disclosure has all features and advantages of the display substrate described above. The details may be referred to the above description and will not be repeated here.

Although some embodiments of a general technical concept of the present disclosure have been illustrated and described, it should be understood by those ordinary skilled in the art that changes may be made to these embodiments without departing from the principle and spirit of the general technical concept of the present disclosure. The scope of the present disclosure is defined by the claims and their equivalents.

What is claimed is:

1. A display substrate, comprising:

a base substrate, comprising a display area and a bezel area on at least one side of the display area;

a plurality of pixel units in the display area, wherein the plurality of pixel units are arranged on the base substrate in an array along a row direction and a column direction, and each pixel unit comprises a plurality of sub-pixels;

a plurality of scanning signal lines arranged on the base substrate, wherein the plurality of scanning signal lines are configured to provide a scanning signal to a plurality of rows of sub-pixels, respectively;

a gate driver circuit arranged on the base substrate and located in the bezel area, wherein the gate driver circuit is configured to the output scanning signal;

a plurality of load compensation units arranged on the base substrate and located in the bezel area, wherein the plurality of load compensation units are between the gate driver circuit and the plurality of pixel units; and a plurality of scanning signal lead wires arranged on the base substrate and located in the bezel area, wherein the plurality of scanning signal lead wires are configured to transmit the scanning signal output by the gate driver circuit to the plurality of scanning signal lines, respectively, wherein at least one load compensation unit comprises a compensation capacitor comprising a first compensation capacitor electrode in a first conductive layer and a second compensation capacitor electrode in a semiconductor layer, and an orthographic projection of the first compensation capacitor electrode on the base substrate at least partially overlaps with an orthographic projection of the second compensation capacitor electrode on the base substrate;

wherein the first conductive layer is on a side of the semiconductor layer away from the base substrate, and the first compensation capacitor electrode is electrically connected to the scanning signal lead wire;

wherein the scanning signal lines and the scanning signal lead wires are in the first conductive layer, and the first compensation capacitor electrode and the scanning signal lead wire that are electrically connected to each other are formed into a continuously extending integral structure;

wherein the display substrate further comprises a first voltage signal lead wire in a second conductive layer, the second conductive layer is on a side of the first conductive layer away from the base substrate; and the second compensation capacitor electrode is electrically connected to the first voltage signal lead wire; and wherein the display substrate further comprises a first conductive connection portion in the second conductive layer, the first conductive connection portion extends from the first voltage signal lead wire towards the display area, and the first conductive connection portion is electrically connected to the second compensation capacitor electrode through a plurality of first via holes.

2. The display substrate according to claim 1, wherein the display substrate comprises N rows of pixel units, and n rows of pixel units among the N rows of pixel units comprise different numbers of sub-pixels, wherein N is a positive integer greater than or equal to 2, and n is a positive integer greater than or equal to 2 and less than or equal to N; and each of a plurality of scanning signal lead wires configured to provide the scanning signal to the n rows of pixel units is electrically connected to a respective compensation capacitor, and an area of the overlap between the first compensation capacitor electrode and the second compensation capacitor electrode of the compensation capacitor for each of the n row of pixel units is negatively related to the number of sub-pixels of the row of pixel units.

3. The display substrate according to claim 2, wherein at least one of the first compensation capacitor electrode and the second compensation capacitor electrode of the compensation capacitor for each of the n rows of pixel units has a size in the row direction which is negatively related to the number of the sub-pixels of the row of pixel units.

4. The display substrate according to claim 3, wherein the n rows of pixel units comprise an $m^{th}$ row of pixel units and an $(m+i)^{th}$ row of pixel units, and the plurality of rows of pixel units further comprise an $(m+j)^{th}$ row of pixel units, where each of m, i and j is a positive integer greater than or equal to 1;

a number of sub-pixels of the $m^{th}$ row of pixel units is less than a number of sub-pixels of the $(m+i)^{th}$ row of pixel units, and the number of the sub-pixels of the $(m+i)^{th}$ row of pixel units is less than a number of sub-pixels of the $(m+j)^{th}$ row of pixel units; and the scanning signal lead wire configured to provide the scanning signal to the sub-pixels of the $(m+j)^{th}$ row of pixel units is not electrically connected to the compensation capacitor, and the area of the overlap between the first compensation capacitor electrode and the second compensation capacitor electrode of the compensation capacitor for the $m^{th}$ row of pixel units is greater than the area of the overlap between the first compensation capacitor electrode and the second compensation capacitor electrode of the compensation capacitor for the $(m+i)^{th}$ row of pixel units.

5. The display substrate according to claim 4, wherein at least one of the first compensation capacitor electrode and the second compensation capacitor electrode of the compensation capacitor for the $m^{th}$ row of pixel units has a size in the row direction greater than a size of at least one of the first compensation capacitor electrode and the second compensation capacitor electrode of the compensation capacitor for the $(m+i)^{th}$ row of pixel units in the row direction.

6. The display substrate according to claim 5, wherein at least one of the first compensation capacitor electrode and the second compensation capacitor electrode of the compensation capacitor for each of the n rows of pixel units has substantially the same size in the column direction; and/or for the n rows of pixel units, a ratio of a size of the first compensation capacitor electrode of the compensation capacitor for one of any two rows of pixel units in the row direction and a size of the first compensation capacitor electrode of the compensation capacitor for the other one of the two rows of pixel units in the row direction is between 1.3 and 400; and/or a ratio of a size of the second compensation capacitor electrode of the compensation capacitor for one of any two rows of pixel units in the row direction and a size of the second compensation capacitor electrode of the compensation capacitor for the other one of the two rows of pixel units in the row direction is between 1.3 and 400.

7. The display substrate according to claim 1, wherein the plurality of first via holes are arranged in two rows in the column direction.

8. The display substrate according to claim 7, wherein for one compensation capacitor, the first conductive connection portion electrically connected to the second compensation capacitor electrode of the compensation capacitor extends substantially in parallel to the scanning signal lead wire electrically connected to the first compensation capacitor electrode of the compensation capacitor.

9. The display substrate according to claim 8, wherein for at least one compensation capacitor, in the column direction, an orthographic projection of the overlap between the first compensation capacitor electrode and the second compensation capacitor electrode of the compensation capacitor on the base substrate is between the first conductive connection portion electrically connected to the first compensation capacitor electrode of the compensation capacitor and the scanning signal lead electrically connected to the second compensation capacitor electrode of the compensation capacitor.

10. The display substrate according to claim 1, wherein the plurality of rows of pixel units comprise at least one pixel unit group comprising adjacent k rows of pixel units, wherein k is a positive integer greater than or equal to 2; and each of the k rows of pixel units has the same number of sub-pixels, and has substantially the same area of the overlap between the first compensation capacitor electrode and the second compensation capacitor electrode of the compensation capacitor.

11. The display substrate according to claim 10, wherein the first compensation capacitor electrode of the compensation capacitor for each of the k rows of pixel units has substantially the same size in the row direction, and the second compensation capacitor electrodes of the compensation capacitor for each of the k rows of pixel units has substantially the same size in the row direction.

12. The display substrate according to claim 11, wherein the first compensation capacitor electrodes of the compensation capacitors for the k rows of pixel units are aligned with each other in the column direction; and/or the second compensation capacitor electrodes of the compensation capacitors for the k rows of pixel units are aligned with each other in the column direction.

13. The display substrate according to claim 1, wherein the second compensation capacitor electrode comprises a protruding portion, and an orthographic projection of the protruding portion on the base substrate at least partially overlaps with an orthographic projection of the first conductive connection portion on the base substrate; and the first conductive connection portion is electrically connected to the protruding portion through a plurality of via holes.

14. The display substrate according to claim 1, wherein the display substrate further comprises a second conductive connection portion in the second conductive layer; and the scanning signal lead wire and the scanning signal line that are configured to provide the scanning signal to a same row of pixel units are electrically connected to each other through the second conductive connection portion.

15. The display substrate according to claim 1, wherein an end of the scanning signal lead wire proximate to the display area is electrically connected to an end of the second conductive connection portion through a second via hole, and another end of the second conductive connection portion is electrically connected to an end of the scanning signal line through a third via hole.

16. The display substrate according to claim 1, wherein at least one of the first compensation capacitor electrode and the second compensation capacitor electrode of the compensation capacitor has a hollow structure, and wherein at least one of the first compensation capacitor electrode and the second compensation capacitor electrode of the compensation capacitor comprises a plurality of solid portions and a plurality of hollow portions, and the plurality of solid portions and the plurality of hollow portions are alternately arranged in the row direction.

17. A display apparatus, comprising the display substrate according to claim 1.

* * * * *